Sept. 26, 1967 H. MUND 3,343,814
DEVICE FOR COATING CHIPS WITH GLUE
Filed June 1, 1965 8 Sheets-Sheet 6

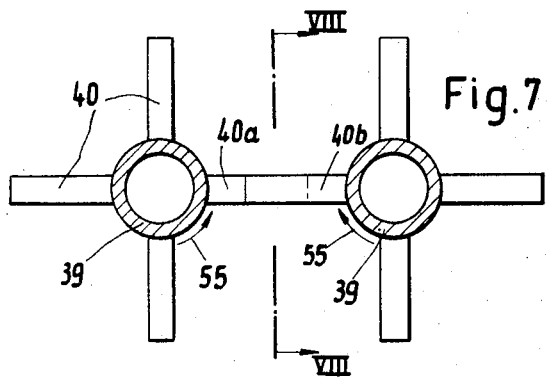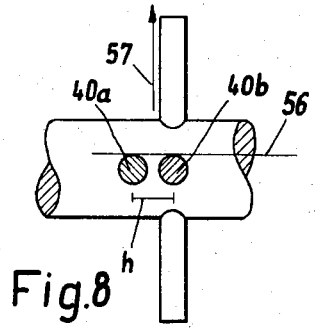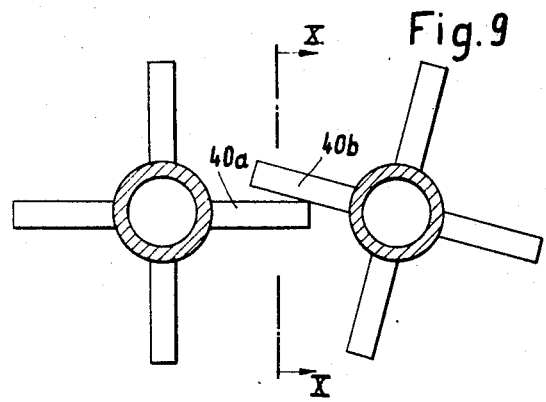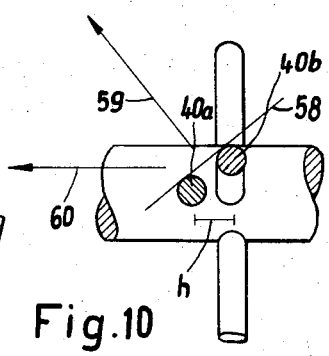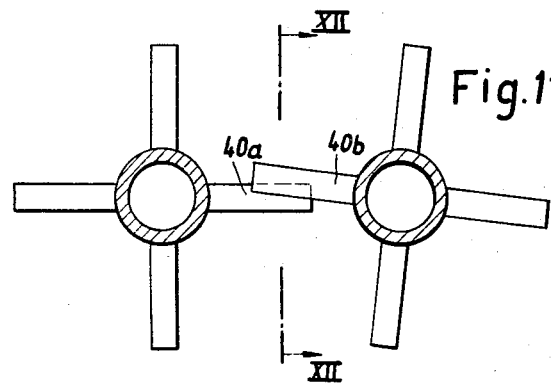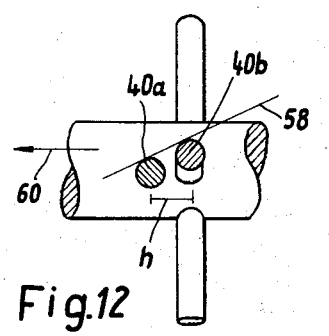

Inventor:
H. Mund
By
Richards & Geier
ATTORNEYS

Sept. 26, 1967      H. MUND      3,343,814
DEVICE FOR COATING CHIPS WITH GLUE
Filed June 1, 1965      8 Sheets-Sheet 7
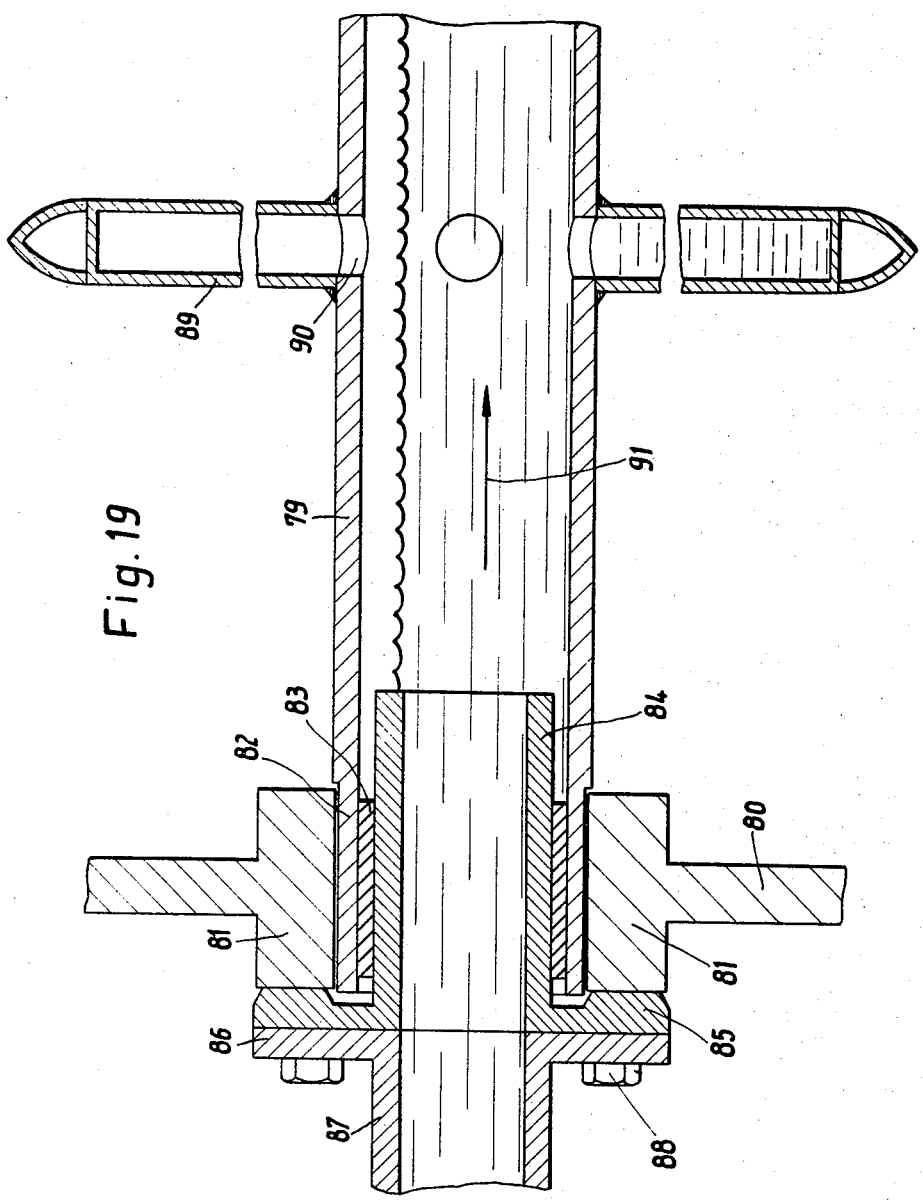
Inventor:
H. Mund
By Richards & Geier
ATTORNEYS

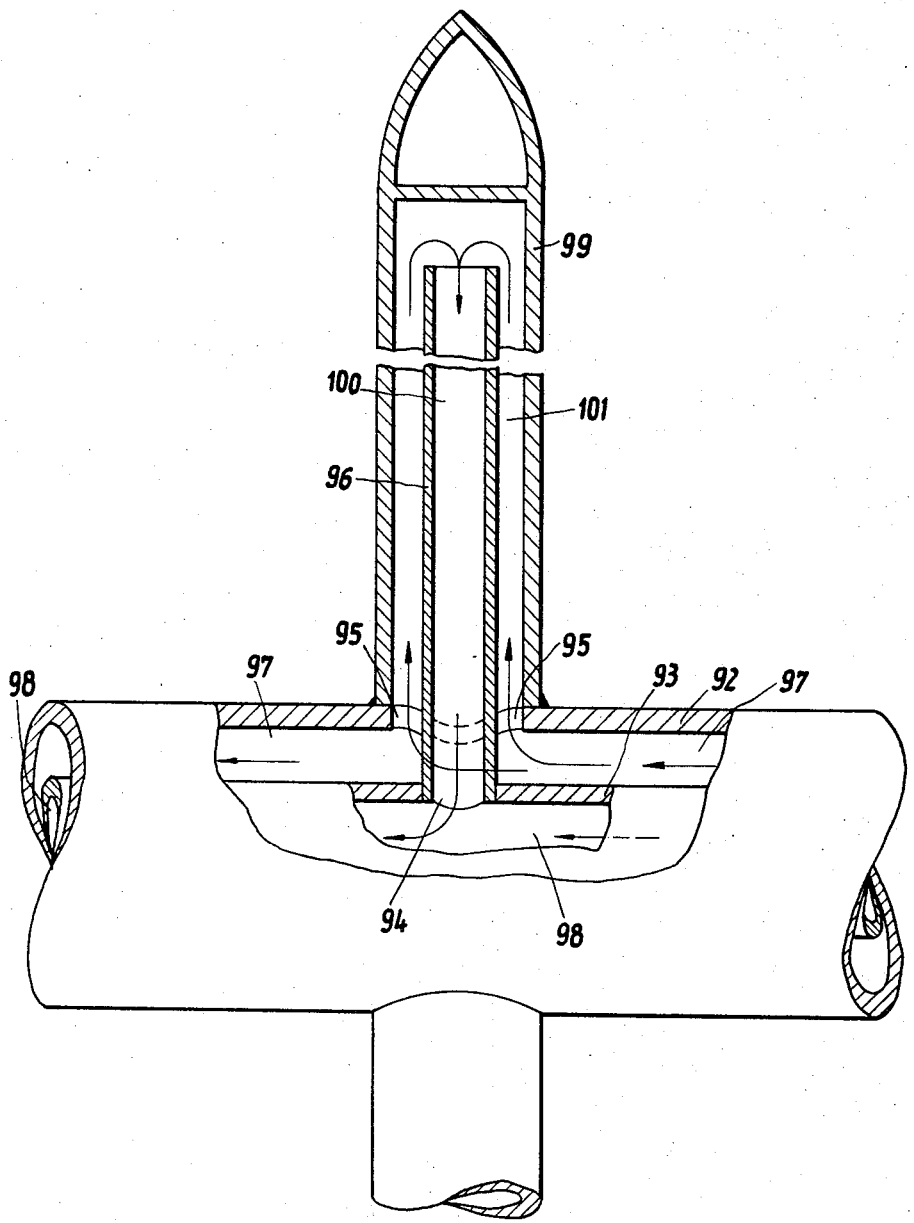

United States Patent Office  3,343,814
Patented Sept. 26, 1967

3,343,814
DEVICE FOR COATING CHIPS WITH GLUE
Heinrich Mund, Springe, Germany, assignor to Firma
Bahre Metallwerk K.G., Springe, Hannover, Germany,
a corporation of Germany
Filed June 1, 1965, Ser. No. 460,078
20 Claims. (Cl. 259—6)

The invention relates to devices for mixing goods in particle form with bonding agents, and is particularly directed to continuously operating devices of trough and drum construction for coating wood chips with glue.

The bonding agents are usually sprayed with compressed air, through nozzles arranged internally along the cover of the drum, on to the chip material which is continually rolled over by agitating shafts and continuously moved forward on screw tracks.

Difficulties were encountered formerly in removing from the drum this spray air impregnated with droplets of glue and fine chip dust, without inconvenience to the surroundings and considerable loss of both glue and fine chips, or to subject it to an economic recovery process. Another problem was to coat the surface of coarse chips more heavily with glue than the fine chips.

It has been proposed to produce devices for coating chips with glue, through which devices a circulation of air flows continuously in a suitable manner. The most successful device of this kind so far is a horizontal mixing drum equipped with a superimposed sifting chamber extending over the whole length of said drum. The chip material falls in an unbroken, dense stream in the vicinity of the front end-wall of the chamber perpendicularly into this chamber, is there seized by a horizontal flow of air, and is so graded that the chips pass, according to size, to locations in the drum at different distances from the end thereof, and thus come within range of the glue nozzles.

The residence time of the chips in the drum decides the amount of glue per unit area of chip surface. Coarse chips pass through the whole length of the drum, thus remaining longer within range of the coating and mixing elements than the medium and fine chips. At the end of the mixing path, their surfaces are therefore wetted with a correspondingly higher proportion of glue per unit area than the smaller chips.

The horizontal sifting flow carries the fine dust to the end of the chamber, where the sifting air and the fine dust are drawn into the interior of the drum by suction produced by a blower. At the end of the drum, the glue-coated chips are discharged through lateral openings in the wall of the drum. A suction pipe at the end of the drum, connected to said blower, exhausts the glue-containing spraying and sifting air at about the height of the filling level, carrying along a proportion of chips. This circulating sifting air is returned to the chamber via the blower and a pipe passing externally along the drum and the wall of the chamber. The chips carried along serve to remove deposits of glue and fine chips automatically from the circulating air pipe.

The air circulating is unavoidably enriched with fine dust in the sifting chamber and with droplets of glue in the drum. The mixed material in the last section of the drum is therefore used as a filter when the suction pipe ends in said mixed material or is placed upon the loose upper layer thereof.

It is furthermore proposed to eliminate deposits of fine dust and glue on the walls of the pipe by increasing the velocity of the air in the air circulating pipe system by means of passages with smaller cross sections.

The measures set forth increase the efficiency and reliability of the device to a considerable extent; however, by the means heretofore known or proposed, it is impossible to prevent the deposit of particles of glue and fine chips on the walls of the air circulating pipe under unfavourable conditions at particularly exposed cross sections, such as pipe bends or elbows. It is true that small degrees of curvature may be selected, but it is impossible to avoid pipe bends in a closed circuit of conventional type.

In addition to the pipe bends, the inlet connection to the sifting chamber is a particularly susceptible section of the circuit. Here, the cross section of the inlet is gradually enlarged toward the opening into the sifting chamber in order to decelerate the circulating air to the low velocity required for grading. As a result of this, droplets of glue and fine chips precipitate out of the circulating flow and are deposited on the walls.

The cross section of the horizontal flow of air should correspond as far as possible to the dimensions of the chamber, in order to obtain good grading efficiency. With the traditional hopper-shaped widening of the inlet connection, however, the required widening out cannot be applied because of the danger of deposits.

Conditions become unfavourable whenever there is a considerable difference between the temperature of the air inside and outside the external pipe. The internal temperature is usually between 40 and 50° C. Cold ambient air caused by seasonal changes or local climatic conditions also cools the internal surfaces of the pipe walls, and the droplets of glue in the outer zones of the circulating air flow therefore condense (they contain about 50% of water) and form a film of glue on the pipe walls; this increases continually, picks up fine dust, and finally blocks the pipe.

These disadvantages of the prior art are overcome by the inventive apparatus. The invention provides a device of drum construction for coating chips, fibres and similar particles of material with glue, said device having nozzles for distributing the glue, agitating shafts for mixing the chips, a superimposed chamber for sifting and charging the chips by means of a circulation of air, and an air circulating pipe located within said sifting chamber in cross flow to the chips falling obliquely on both sides of the pipe walls, the mouth of said pipe being located opposite a concave air reflector attached to the inside of the front end-wall of said chamber to deflect the air flowing out of the mouth of said pipe, said sifting chamber being shorter than said mixing drum.

In a preferred form of the invention, the external pipe system, inevitably exposed to the temperature effect of ambient air, is replaced by a system having only an extremely short length of outside pipe, namely above the last section of the drum. According to the invention, the air circulating pipe takes the shortest possible path for a circuit from the suction connection to the end of the drum. The greater part of the air circulating pipe lies in the middle of the sifting chamber and is thus exposed to the favourable temperature effect of the warm chips falling in a cross flow at an angle to the course of the pipe, and the air circulation therefore operates largely independently of outside temperature effects. Thus the greatly feared condensation phenomena no longer occur in the air circulating pipe. Under extremely unfavourable climatic conditions, the short external length of pipe can also be heated.

The pipe elbows heretofore used to carry the flow of air in the external pipe to the sifting chamber are replaced by a concave air reflector attached to the front end wall of the sifting chamber. The air flowing in the internal pipe along the length of the sifting chamber leaves the pipe mouth located close to the front end wall, and flows towards the centre of the air reflector; this deflects the flow through 180° and divides it into two streams flowing side by side along the length of the chamber. Thus the deflection of the air flow no longer takes place in a closed pipe which is difficult of access, but is effected by an exposed reflector which the air reaches and leaves in free flow.

The fact that the sifting chamber superimposed on the mixing drum is shorter than said mixing drum ensures that the sifting air and the fine dust enter the interior of the drum, and the material being mixed (hereinafter called the mix material) therein, as a result of the suction obtaining in the last suction of said drum directed towards the end thereof and produced by means of a blower. In the last section of the drum, therefore, a mixture of chips of all sizes, and of sifting and spraying air, is exposed to the action of the agitator arms and the final glue nozzles. This ensures that the sifting and spraying air flowing through the loose upper zones of the mix material is filtered. The droplets of glue and fine chips carried along in the flow of air are introduced according to the invention into the mix material at such an early stage that they are uniformly distributed through the mix material up to the end of the drum.

The device exhibits, as an additional feature, an air circulating pipe in the form of an air nozzle, whose initial circular or almost square cross section is extended steplessly and vertically to the mouth made in the form of a narrow longitudinal slit. An air nozzle exhibiting a flow cross section of overall equal size is particularly advantageous.

Air flows through an air nozzle of the design according to the invention as far as its mouth at a constant velocity, and no droplets of glue or chips can therefore be deposited. The circulating air flows in a stream reaching almost over the whole height of the chamber. This produces the required height distribution of the sifting flow which, as is known, should include the whole cross section of the chamber. The combination of an air nozzle according to the invention, which accomplishes a height distribution of air without enlarging the flow cross sections, with an air reflector of the type mentioned, causes the deceleration of the flow of circulating air to grading velocity to take place, not in pipe cross sections menaced by deposits, but in the free space inside the chamber. A sifting flow almost completely covering the chamber is obtained, and, at the same time, the danger of deposits and resulting breakdown of air circulation is considerably decreased.

The air nozzle is carried so far through the incoming flow of material that its mouth is outside the veil of chips. This ensures that the incoming flow of material is seized only by the fully formed, reflected sifting flow reduced to the required grading velocity. The air nozzle is also designed so that its upper edge is made in the form of a pointed gable. This avoids deposits on the air nozzle located in the flow of chips.

It is also preferred that the air nozzle be opened at its upper end below the charging orifice, so that some of the chips introduced fall into said air nozzle, whence they are thrown against the reflector. In this way, the inside surface of the reflector is subjected to constant automatic cleaning by chips which fall into the air nozzle and are carried along.

In a preferred form, the reflector has guide vanes arranged vertically on both sides of the air nozzle at the reflector outlet, to stabilize the flow of deflected air. The flow of air deflected through 180° by the reflector may exhibit unwanted turbulence. The above-mentioned arrangement of guide vanes ensures that the flow of reflected air is free of turbulence and leaves said air reflector as a uniformly linear flow.

It is preferred to use an air nozzle the body of which is divided in its central, vertical, longitudinal plane and can be opened by means of hinges attached to the upper edge, and, a reflector attached to a door which is hinged outwardly. These measures make both the air nozzle and the reflector easily accessible and easy to clean.

The device according to the invention is equipped with a plurality of side-by-side, synchronous-drive agitator shafts fitted with cross bars. Adjacent agitator shafts rotate in opposite directions, and their pairs of cross bars are slightly staggered in relation to each other as that the agitating portions of said cross bars intersect. One shaft always leads its adjacent shaft by an adjustable angle, so that adjacent pairs of cross bars, coming into engagement, form a steep plane with their upwardly moving intersecting ends, for the purpose of moving the chips onwards. It is preferred that the drive of an agitator mechanism having adjacent shafts running in opposite directions and an even number of shafts be so arranged that the number of pairs of elevating shafts in engagement with each other is half the number of shafts present. It is furthermore preferred when an endless chain be used to drive the agitator-mechanism shafts, that the angle of lead between adjacent shafts be adjustable by turning the shaft gear of the respective shaft in relation to the chain. This causes each elevating pair of bars, adjusted in relation to each other by angle of lead, to produce a conveying impulse to the mix material, the magnitude of said impulse being accurately adjustable by the means proposed, as will be explained hereinafter with the aid of an example.

Hollow agitator shafts are preferred for the agitator mechanism of the device, said hollow shafts being fitted with similarly hollow agitator arms, said shafts and arms having a heating or cooling medium flowing through them. Two particularly advantageous structural designs are possible with such shafts. In the first such design the hollow agitator shafts are rotatable and sealed in relation to a stationary connecting pipe at each shaft end. A cooling liquid flows through the agitator shafts and the hollow agitator arms, the cavities of which are in communication at their bases with the shaft cavity. A liquid feed fitted with a temperature control allows the liquid level in the cavity system to rise only high enough to allow the liquid to flow from the hollow agitator arms back into the agitator shaft when said agitator arms are passing through the uper half of the circle of rotation. In the second design, each hollow agitator shaft has two longitudinally parallel ducts or, preferably, a central duct and an annular duct. This latter construction is simply obtained by inserting a thin co-axial tube in the agitator shaft, said tube being fitted with hollow rods communicating with the interior thereof, open at the top, and located co-axially within the hollow agitator arms which are closed at the top, so that a medium adapted to the exchange of heat, flowing through the cooling jacket of said agitator shaft under pressure, reaches the central tube, which functions as a drain pipe through said agitator-shaft cooling jacket and said hollow rods.

Both systems provide accurate control and setting of the surface temperature of the agitator mechanism. Small devices for coating chips with glue are more susceptible to the effect of ambient temperature than large machines with large cross sections. The operating temperature may be favourably influenced by heating the agitator mechanism. In order to avoid the mix material being mixed below the minimum permissible temperature for the distribution of glue, small machines with cold ambient air should always be heated, and machines of all sizes should be heated when being started up. On the other hand, large machines having a correspondingly lower capacity for cooling, or small machines used in tropical climates or under highly frictional mixing conditions, have a tendency to develop inadmissibly high operating temperatures (60° C. and more), at which evaporation of the hardener and pre-hardening of the glue can occur. It is therefore important for the heat balance of the gluing and mixing operations in the drum to be controllable. This is easily accomplished by passing a flow of liquid through a hollow agitator shaft, said flow only partly filling said shaft, so that the similarly hollow agitator arms are filled with the liquid in the lower part of the revolution, their walls thus exchanging heat with said liquid. In the upper portion of the revolution, the liquid flows by gravity out of the bars back into the hollow shaft, thus acting as a heat carrier. While one system uses the gravity of the liquid to obtain a flow through the agitator arms, the second system provides the agitator shafts and agitator arms with double walls. Freshly cooled liquid always flows to the agitator mechanism through the outer casing of the agitator shaft and the agitator bars, while the central cavities of the shafts and bars are used to return the "used" liquid, so that the latter is removed as far as possible from the surface of the agitator mechanism and thus from the mix material, and no heat equilibrium can occur therebetween. Hollow trunnion bearings serve to feed and drain the liquid heat carrier. In order to avoid any unnecessary heat exchange between the cooling medium in the outer casing and the used medium in the central cavity of each agitator shaft, the liquids in these two ducts are in counterflow. Of the two systems, the first is the easier to produce, as the agitator shaft has only one cavity, whereas according to the second system, constant circulation through the agitator arms, and thus more accurate control of the surface temperature of the arms, is ensured. Pressure or flow control in the feed section of the double-wall system has its full effect on the flow within the arms, whereas control of the feed in the one-duct system mainly affects the shaft flow and only indirectly controls the heat balance of the agitator arm walls.

A partition is preferably provided in the form of a slide at the end of the drum behind the last nozzle. This partition is inserted in a slot running across the width of said drum in the upper portion thereof, is sealed from the wall of said drum and is adjustable vertically between the cross bars almost as far as the agitator shafts. The principle of using the mix material as a filter for the glue and dust-containing air is thus utilized more extensively. The slide serves to allows the air to pass not only through the highly porous zones directly under the drum cover, but also through the more solid zones of material close above the agitator shafts. The slide is arranged behind the last nozzle in order to avoid wetting the air with glue again before it enters the suction pipe, which would partly nullify the filtering action. Said slide is vertically and steplessly adjustable, either by hand or by means of a motor, so that the path of the air flow in the rear portion of the drum, and thus the degree of filtering and the porportion of chips carried along, can be controlled.

The apertures for discharging the material at the end of the drum are located on one side or on both sides of the drum, and approximately at the axis level of the agitator shafts, starting at the lower curve of said drum, and their free-passage cross sections are controllable by means of an adjustable slide running plane-parallel to the discharge aperture. When the slide is moved in a downward direction manually or by means of a motor, it opens the aperture from the top. Alternately, an adjustable slide can be provided for controlling a discharge aperture, which slide fills the lower portion of a rectangular displaceable frame. When moved in an upward direction, this slide opens the lower part of the discharge aperture, and when moved in a downward direction, it opens the upper part. The invention also provides for the location at each discharge aperture, in addition to the adjustable slide controlling the throughput and degree of filling, of a manually or motor-operated flap for closing said discharge apertures or the passage cross sections opened and adjusted by said slide.

The arrangement of the discharge apertures and the design of their closure elements are dependent upon the conveying principle used and are selected in such a manner that the device can be adjusted to all possible operating conditions. By fitting adjacent pairs of bars to the agitator shafts, a constant conveying impulse is exerted on the mix material. This produces a force constantly acting along the full length of the drum, comparable to the gravity component acting in the direction of the axis of the drum in the case of an inclined drum. Since the mix material consists of small particles kept in constant motion relative to each other by the agitator arms, the result of the conveying force with a constant conveying motion, when the discharge apertures are closed, is pressure by the mix material on the walls of the drum in all directions in the last section. This pressure is utilized for discharging, by opening the discharge apertures. The pressure of the material being conveyed is increased by the weight of the mix material to a maximum in the lower portion of the drum walls. Since a lateral discharge is desirable for the onward motion of the glue-coated chips, the discharge apertures in a device according to the invention are arranged laterally in the lower part of the belly of the drum. Each hatch-like, rectangular discharge aperture is provided with a slide which is capable of being moved obliquely upwards or downwards to the height of the respective passage cross section. This slide can be either manually or motor driven.

The size of the free passage cross section has a decisive effect on the degree of filling. This is also dependent upon the conveying force exerted on the mix material which is substantially defined by the r.p.m. of the agitator shafts and the lead angle of adjacent pairs of bars. The throughput depends upon the quantity of glue-coated chips desired. In view of the independent influencing factors, the device must be adjustable to various throughputs, but at the same time the quality of the glue coating is required to remain constant.

When starting up a device according to the invention, a satisfactory adjustment of the slide for various throughputs is determined and marked. In this way it is possible to change the throughput during operation without interruption, and there will be no danger that a change in influencing factors will cause an unequal degree of filling in the drum. The slides should remain adjusted until the production programme calls for a different throughput. The flaps located next to the slides serve to close the discharge apertures when the operation is interrupted. They come into use both before and after the device is stopped. After a stoppage requiring the drum to be emptied, the device is first set in operation with closed discharge apertures until the first filling of mix material is adequately glue-coated and mixed. Only then are the closure flaps opened, and the passage cross sections adjusted by means of the slides to a specific throughput are opened for continuous discharge.

It is also possible to open the slide upwardly, in which case the discharge apertures are opened from the bottom. Use is made of this possibility when the drum is to be completely emptied for cleaning. In this case it is desirable that the free passage cross sections reach down to the level of the floor of the drum.

It is preferred that in normal operation the ratio of the width of surface of filling material exposed to spraying to the height of said filling material is at least 3:1. The ratio between the diameter of the agitator portions of the cross bars and the diameter of the agitator shafts is preferably less than 5:1. Both of these characteristics provide the advantage that an individual chip reaches the free surface of the mix material, and thus comes within range of the glue nozzles, more frequently than would be the case in a deep trough equipped with thin agitator shafts. Furthermore, the amount of glue sprayed per running meter of drum length can be increased, since the sprays of glue can be distributed over a greater width of drum. Agitator shafts which are thick in relation to the length of agitator bars serve to avoid cores of mix material on the agitator shafts rotating as a whole and showing no displacement of particles. Both measures reduce the length of time that chips must spend in the drum, thus permitting the use of mixing drums substantially shorter than heretofore.

The invention is described in greater detail below with reference to particular embodiments and to the drawings, in which:

FIGS. 7–12 are schematic front and side elevations of agitator shafts each in the vicinity of a cross bar, said shafts being rotated in opposite directions and with an angle of lead, for the purpose of moving the mix material onwards;

FIG. 19 is a longitudinal section through a hollow agitator shaft traversed by a liquid medium, with hollow agitator arms and a stationary, sealed connecting pipe;

FIG. 20 is a section through a mixing mechanism also traversed by a liquid medium, in which agitator shafts and agitator bars have double walls.

Figure 1:
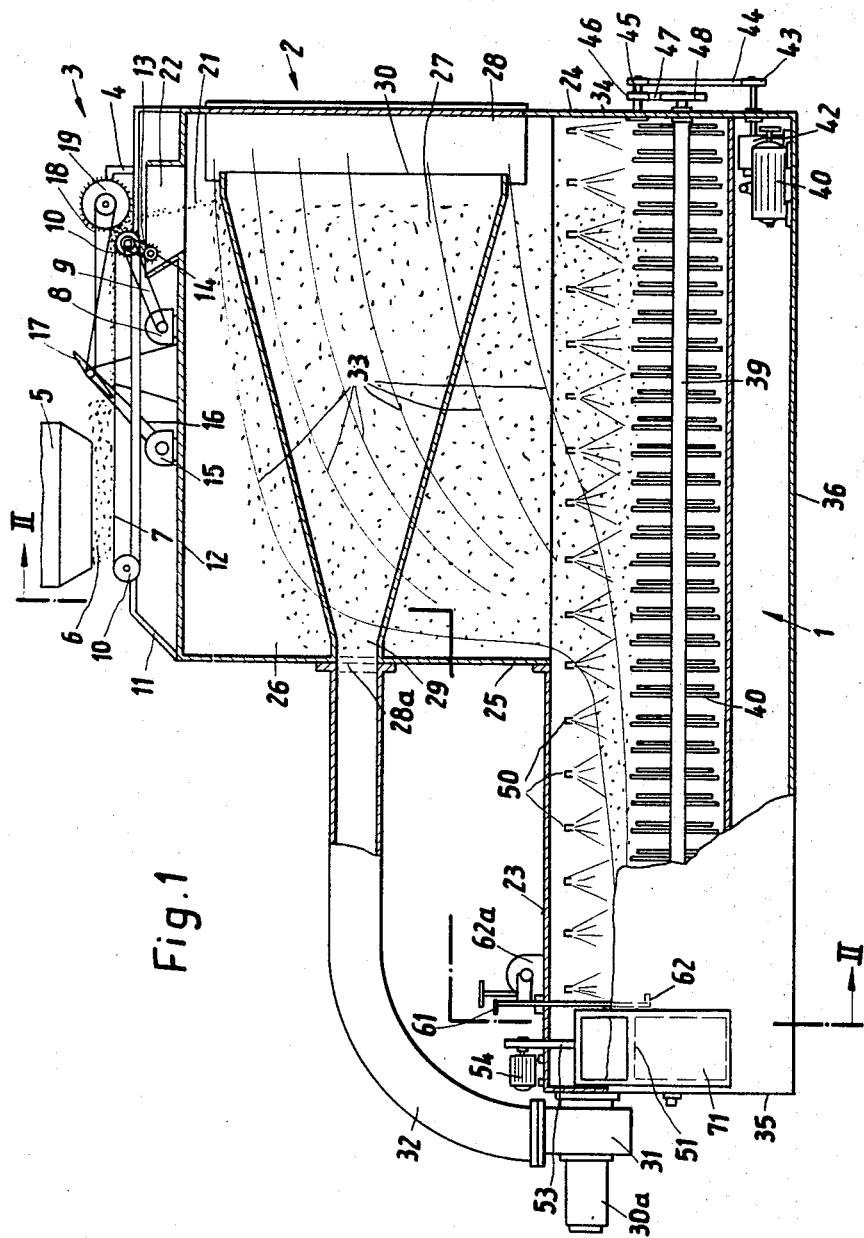
FIG. 1 shows a side elevation of a glue-coating device in section.
Figure 2:
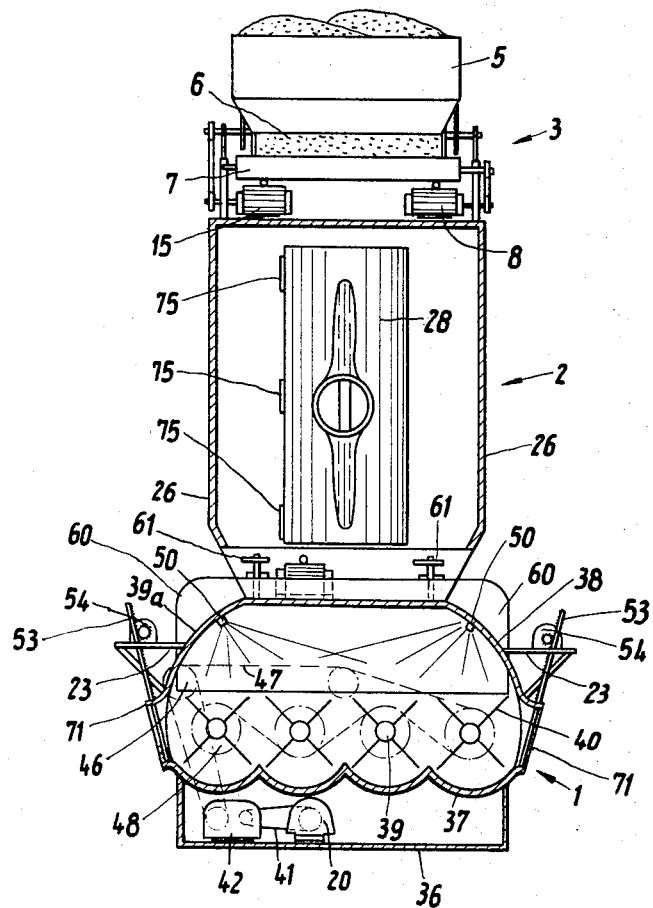
FIG. 2 illustrates the device in FIG. 1 sectioned along the line II—II.

A glue-coating device according to the invention consists substantially of three assemblies arranged one above the other: a mixing drum 1, a particle sifting or sorting chamber 2 thereabove, and a device 3, arranged above said sifting chamber, for metering and feeding chips. In FIGS. 1 and 2, arrows in conjunction with reference numbers 1, 2 and 3 indicate the respective assemblies of the whole device illustrated therein.

Material charging station 3 exhibits a bin 5 which, when the device is in operation, is constantly filled with ungraded particles to be glue-coated. The particles can be, for example, fibres, wood chips, or other particulate material. From said bin 5, or from another feeding device, a constant, accurately measurable flow of chips 6 is discharged on to a wide, endless conveyor belt 7. Belt rollers 10 are mounted on a frame 11 attached to upper platform 12 of sifting chamber 2. One of rollers 10 is driven from a motor 8 by means of a belt drive 9. This roller 10 in turn drives, by means of a belt drive 13, a brush roller 14 which is arranged to clean belt 7 ahead of front roller 10. A second motor 15 attached to platform 12, drives, by means of a belt drive 16, a rake shaft 17 fitted with scrapers, which smooths and spreads the chip flow 6 discharged on the conveyor belt 7 as an irregular mat. The shaft 17 drives, by means of a belt drive 18, a metering roller 19 located at the forward end of belt 7 and mounted on frame 4. Metering roller 19 exerts a slight pressure on the oncoming chip flow, and the prongs thereof break down any heaps or dumps of chips; thus between roller 19 and conveyor belt 7, a flow of chips 21 of uniform height and uniformly spread over the width of said conveyor belt falls constantly downwards.

Sifting chamber 2 is enclosed by a front and rear end wall 24, 25 and two lateral walls 26. The top of the chamber is closed by platform 12, the bottom, where it passes into the drum, being open. In platform 12, below the front end of conveyor belt 7 and metering roller 19, there is an aperture extending across the width of chamber 2 and surrounded by a feed hopper 22 through which the chips fall into chamber 2 in a thick veil.

Figure 13:
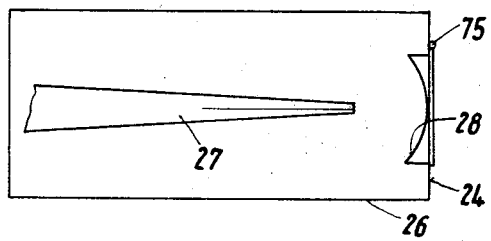
FIGS. 13–16 are schematic drawings showing various designs for air nozzles and reflectors.

An air nozzle 27 is located centrally in chamber 2 in the longitudinal direction of said chamber. Said air nozzle 27 consists of a pipe attached to an aperture 28a in rear end-wall 25 of the chamber, said pipe exhibiting at 29 a cross section corresponding to aperture 28a. In most cases this is circular, but it may also be rectangular or almost square. After this short length of pipe of compact cross section, the air nozzle 27 constantly becomes larger in a vertical direction, so that its mouth 30 becomes a long vertical gap in front of the inside of front end-wall 24. The increase in the height of said air nozzle in the longitudinal direction coincides with a reduction in the width, so that there is no difference in the area of the differently-shaped cross sections. Open mouth 30 of air nozzle 27 faces an air reflector 28 attached to the inside of front end-wall 24, said reflector consisting of a vertically attached, originally rectangular plate curved uniformly and concavely in relation to the interior of the chamber. FIG. 13 shows a plan view of a simple design of said air reflector 28. Attached at the rear end of drum 1 is blower 31 driven by a motor 30a, the suction connection of said blower being located in the upper portion of the drum end. Said blower 31 exhausts air from the end of the drum and compresses it in a pipe 32 of circular or almost square cross section, said pipe passing in a short bend from blower 31 to the aperture in rear end wall 25 of sifting chamber 2, where it is attached. From the mouth of pipe 32, air flows through nozzle 27 at an undiminished flow velocity, impinges upon air reflector 28 which deflects the flow of air through about 180° and spreads it, so that when it leaves said air reflector it covers the whole width of the chamber. This flow of air, distributed by the air nozzle over the entire height of the chamber, seizes the dense veil of chips 21 after leaving air reflector 28. The individual flow lines 33 shown in FIG. 1 are intended to indicate the approximate path of the flow of air. The extent to which individual chips from chip veil 21 follow these paths, or are forced into them by the flow air, depends upon the size of the chips. In FIG. 1, the insertion of dots of different size in sifting chamber 2 indicates that the coarse chips (heavy dots) are only slightly deflected from the original vertical path, falling through chamber 2 perpendicularly or slightly obliquely and entering drum 1 well to the front (far to the right in FIG. 1). In contrast to this, medium-size chips are deflected sharply, and fine chips very sharply, from their original paths, entering the mixing drum at various distances from the front end. The result of the grading of incoming chip veil 21 is a separation of said veil, in the longitudinal direction of chamber 2 and drum 1, according to the size and weight of the chips. Large chips enter the drum right at the front; the finer the chip the farther it is carried by the sifting flow.

Figure 18:
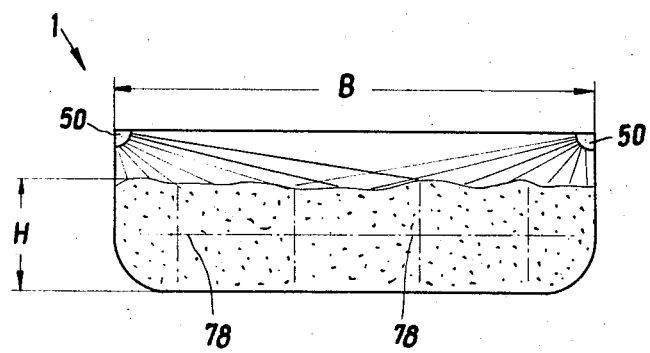

Mixing drum 1 is built with straight end-walls 34, 35 and laterally arched side walls 38, 39a which are also arched over at the bottom into floor 37 of said drum. Said drum rests upon a frame 36. It is longer than the sifting chamber and, in the rear part, is closed at the top by a curved plate 23. Located within the lower half of said drum are agitator shafts 39, running along the length of the drum and fitted with bars or arms 40, preferably in the form of a cross. The agitator shafts are rotatably mounted in front end-wall 34 and in rear end-wall 35. Below drum 1, a motor 20 is attached to the frame 36, and drives a transmission 42 by means of a chain 41, said transmission also being attached to frame 36. Drive pinion 43 of transmission 42 drives, by means of a chain 44, an intermediate shaft 45. Attached to the latter is a chain sprocket 46 driving, by means of chain 47, all of sprockets 48 which are attached respectively to the free ends of the agitator shafts passing through front end-wall 34. FIG. 2 shows how chain 47 is brought into engagement with each sprocket 48. Drum floor 37 is corrugated in cross section and is so conformed to the circles of rotation of the agitator bar ends that when the bars rotate, their ends move closely against curved drum floor 37. In the area of the upper arches of side walls 38 and 39a of drum 1, nozzles 50 are distributed along the whole length of said drum in known fashion, for the purpose of spraying a bonding agent. Said nozzles 50 carry the bonding agent in wide jets (see FIGS. 1, 2 and 18) and in the form of a fog of droplets onto the surface of the mix material, which is kept in constant agitation by agitator bars 40. The degree of filling should be so arranged that said agitator bars are always covered, as indicated in FIG. 18.

At the end of drum 1, and on one side or on both sides, is located a slide 71 to control the free passage cross sections of discharge apertures 51 (shown dotted in FIG. 1). Said slide 71 is moved up or down by a motor 54 attached to plate 23 through known transmission means 53. Various designs of this slide are shown separately in FIGS. 3 to 6 and will be explained later. These figures also show a flap 52 located at a slide and serving to close off a discharge aperture 51.

According to the invention, a conveying impulse is imparted to the mix material, by adjacent elevating bars 40. These bars, engaging with each other, are staggered in relation to each other by an angle, thus forming a steep plane. This principle is explained below with reference to FIGS. 7 to 12. FIG. 7 illustrates a front elevation of two adjacent agitator shafts, each equipped with four bars 40 in the form of a cross. The direction of rotation of the shafts is indicated by arrows 55. Shafts 39 are so close together that the circles of rotation of bars 40 intersect, and the free ends of two bars 40a and 40b, located between shafts 39, lie side by side. If the synchronously driven shafts 39 are arranged relative to one another so that the bars on adjacent shafts are parallel, the result is the picture shown in FIGS. 7 and 8. Engaging bars 40a and 40b form a plane indicated by line 56 lying parallel with the plane through agitator shafts 39. In moving upwards, bars 40a and 40b impart a conveying impulse in the direction of arrow 57. This causes the mix material above these two bars to be carried upwards.

FIGS. 9 and 10 show the same agitator shafts 39 with a different bar positioning of bars on adjacent shafts. In these figures, there is an angular displacement between bars. When bars 40a and 40b engage, bar 40b is now leading. The intersecting free ends of said bars now form a steep plane, as indicated by line 58. The mix material lying above bars 40a and 40b thus receives an impulse in the direction of arrow 59, and is thus carried not only upwards but simultaneously in the direction of arrow 60a, and therefore in the desired direction of travel. In FIGS. 11 and 12, the cross bars exhibit a smaller angular displacement and plane 58 is less sharply inclined. Thus the component of the conveying impulse acting in the longitudinal direction of the drum is smaller, and the speed of the mix material along the drum differs from that in the arrangement according to FIGS. 9 and 10. The angular displacement of the cross bars is easily accomplished by removing chain 47 from the sprocket 48 of the agitator shaft 39 which is to be set to a lead angle, and replacing said chain after said agitator shaft has been rotated through the desired lead angle. In this way, the mixing mechanism can be rapidly changed to the desired conveying velocity whenever the throughput is altered. Accurate setting of the slope of the engaging bars of adjacent agitator shafts contributes substantially to the quality of the glue coating. If the conveying speed is too high, the mix material is compressed at the end of the drum and also fills the upper portion of the drum in an undesired manner, whereas in the area below the sifting chamber there is only a small amount of mix material in the drum. In this case, when bars 40 pass through the upper portion of their revolution, they are not covered by mix material, but lie within the range of the glue nozzles.

At the rear end of the drum and behind final nozzle 50, there is a partition 60 in the form of a slide inserted in a slot running across the width of the drum, in its upper portion, and sealed in relation to the walls of the drum. This partition 60 is adjustable in height between stops 61, 62. Adjustment is effected by means of a motor 62a via pinions and racks or other transmission means. The function of partition 60 is to allow the air flow containing glue and fine dust flowing through the upper arch of the drum to enter the mix material.

The method of operation of the embodiment described above is as follows. The dense chip veil 21 falling through feed hopper 22 into sifting chamber 2 is seized by the sifting flow passing across the whole cross section of the chamber, and is graded on its way down to drum 1. According to their size and weight, the chips fall into drum 1 at various distances from the beginning of the drum, and so into the mix material. Thus the dwell period in the drum of the small chips, which arrive substantially later than the large chips, is shorter, with the result that, on an average, their surfaces are wetted less with the bonding agent than are the surfaces of the large chips. The mix material fills the drum uniformly. Bars 40 ensure intensive mixing of the chips, so that chips which have already reached the spray area of the glue nozzles and have been wetted with glue, exchange glue with the unwetted surfaces of other chips, thus ensuring the most uniform possible glue distribution. By reason of the conveying impulse imparted by bars 40, the mix material moves constantly forward along the drum, and is eventually discharged through the free passage cross sections of discharge apertures 51, accurately sized by slides 71, and located laterally below agitator shafts 39. Air circulation is maintained by blower 31 which exhausts the air upwards from the end of drum 1. By means of partition 60, the circulating air is passed through the mix material in the last section of the drum, and the fine dust and glue carried by said air is largely deposited in the mix material. The air exhausted by blower 31 contains only a small amount of fine dust and glue and an amount of mix material, which serves to clean the circulating-air pipe system. The air velocity in pipe 32 is high, in order to avoid any deposits of glue and fine dust particles. This high velocity is maintained, when the air passes through air nozzle 27 as far as mouth 30, as a result of the design of said air nozzle. At the same time, the location of said air nozzle in the interior of sifting chamber 2 ensures that the pipe wall is not exposed to cooling by ambient air, and there is therefore no condensation of water-containing glue droplets.

Figure 3:
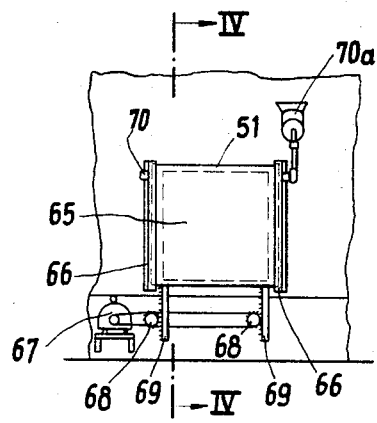
FIG. 3 is a plan view of a simple design of slide with flap.
Figure 4:
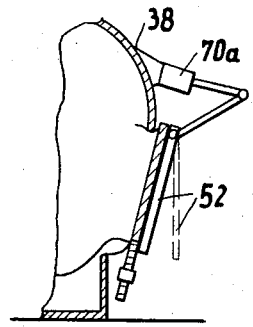
FIG. 4 is a side elevation of FIG. 3 sectioned along the line IV—IV.

Free passage cross sections 51 are adjustable by means of slides. A simple design is illustrated in FIGS. 3 and 4. In FIG. 3, a discharge aperture 51 (shown dotted) is completely closed by a rectangular slide 65 carried in lateral rails 66. A motor 67 drives two pinions 68 engaging with racks 69 attached to the slide at the bottom. In order to set a specific free cross section, or its specific height, slide 65 is drawn down. In FIG. 4 a flap 52 is illustrated in addition to slide 65, said flap being lateraly attached by means of hinges and being capable of being rotated by a drive 70a. Said flap 52 serves to close off the free passage cross section which has been adjusted to a specific throughput by means of slide 65.

Figure 5:
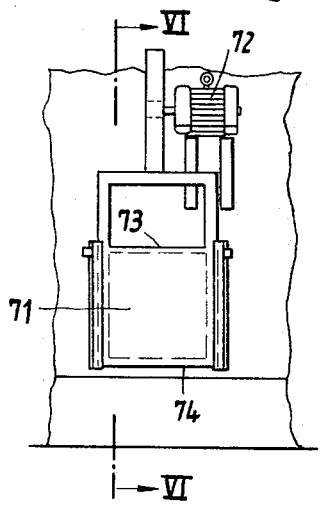
FIG. 5 is a plan view of a double-acting slide with flap.
Figure 6:
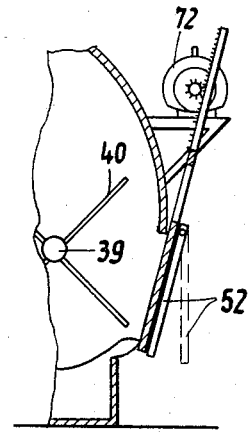
FIG. 6 is a side elevation of a double-acting slide sectioned along the line VI—VI in FIG. 5.

The design shown in FIGS. 5 and 6 shows a slide 71 which, when moved downwards by motor 72 exposes a free passage cross section above its upper edge 73 and, when moved upwards, exposes a free passage cross section below its lower edge 74.

Air nozzle 27 is preferably made in the form of a sharp gable at its upper edge, in order to avoid deposits of chips. Nozzle 27 is preferably divided along its central, vertical, longitudinal plane, the two halves being connected by a plurality of hinges arranged along its upper edge, and being held by an easily released connecting means at the bottom. This makes the inner wall of the nozzle easily accessible for cleaning. At the top, and below the material-charging location (see FIGS. 1, 15, 16), nozzle 27 may be open, so that a portion of the incoming chip veil falls into said nozzle and is thrown by the rapid flow of air against the reflector, which it cleans. The rear side of the reflector is preferably made in the form of a door which can be opened outwardly by means of hinges (see FIG. 2), making the internal surface of said reflector also easily accessible.

Figure 14:
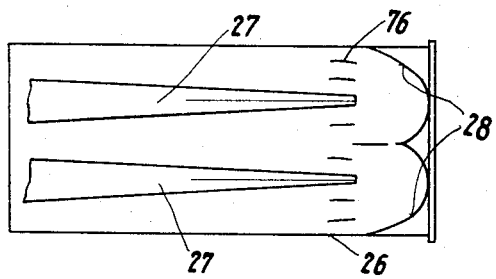
Figure 15:
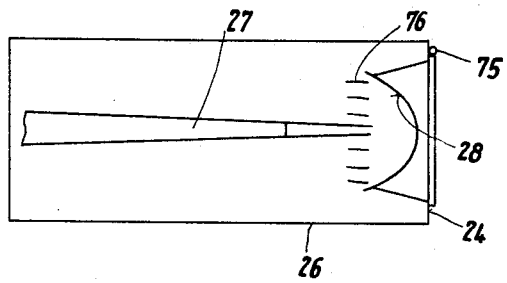
Figure 16:
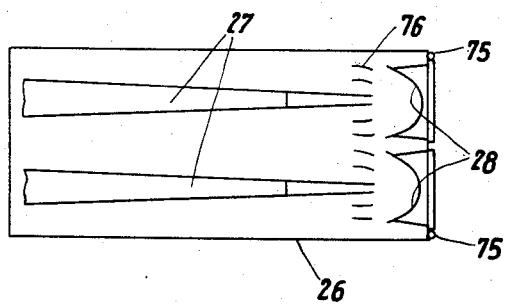

FIGS. 13 to 16 illustrate various shapes and arrangements of air nozzles 27 and air reflectors 28. FIG. 13 corresponds to the simple design heretofore described. For wide sifting chambers, the double shape shown in FIGS. 14 and 16 is preferred. FIGS. 14–16 show air reflectors fitted at their initial cross sections with continuous vertical guide vanes 76 for stabilizing the reflected flow of air. Such stabilizers contribute considerably to the quality of the grading, since grading results are generally unsatisfactory with a turbulent flow.

Figure 17:
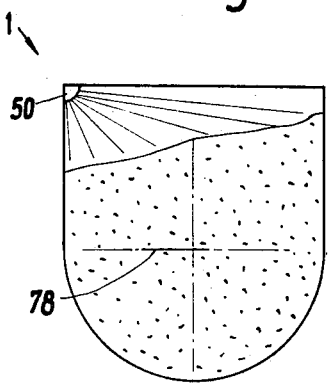
FIGS. 17 and 18 show a comparison between satisfactory and unsatisfactory mixing drums.

FIGS. 17 and 18 show a comparison indicating that a device equipped with a plurality of agitator shafts (indicated by dotted lines 78) and a flat mixing drum (FIG. 18), as compared with a device of very compact cross section, exhibits a substantially larger surface lying within range of the glue nozzles than the latter (FIG. 17). If, in addition to this, adequately thick agitator shafts are used, the resulting uniform good mixing intensity, and the large surface of mix material exposed to gluing, result in a considerably shorter dwell period for the chips in the drum. For this reason, a drum of this type may be substantially shorter than has heretofore been customary.

FIGS. 19 and 20 each show an example of design of cooling and heating systems proposed in accordance with the invention and located within the mixing mechanism. FIG. 19 is a part view of a hollow agitator shaft at its bearing in one end wall 80 of the drum. Shaft trunnion 82 is rotatably mounted in schematically indicated bearing shell 81. Intermediate connector 84, in conjunction with seal 83, is carried in hollow shaft trunnion 82, being adapted and screwed to the end face of the bearing by means of a flange 85. Seal 83 is firmly seated on connector 84, sealing stationary connector 84 from rotatable shaft 79. A liquid-conducting line 87 is connected to flange 85, for example in the manner shown in FIG. 19, by means of a flange 86 and screws 88. Shaft 79 is fitted over its whole length with cross bars, similarly to the mixing mechanism in FIGS. 1 and 2. These agitator bars 89 are hollow. Their cavities communicate via apertures 90 with the shaft cavity. Constantly flowing through hollow shaft 79 is a flow of cooled liquid (indicated by arrow 91), which is fed in at one end of said shaft and which issues at the other end. Enough liquid is supplied to keep the cavity system more than half full of liquid. Thus, when the cross bars rotate, there is a constant emptying and filling of hollow bars 89. The medium can supply heat for heating the mixing mechanism, or can dissipate heat in the event of excessive frictional heat between the mix material and the mixing mechanism.

FIG. 20 shows a preferred construction for a forced circulation system within which the cooled medium flows along the casing surfaces of the shafts and bars. A tube 93 having bores 94 aligned with bores 95 in a hollow shaft 92 is inserted in said hollow shaft and attached coaxially. Pipes 96, open top and bottom, are passed through bores 95 and are attached with radial spacing to tube 93. Bore 94 is sealed from annular duct 97. Above each pipe 96 is placed a hollow agitator bar 99, closed at the top and running to a point, and open at the bottom, said bar being sealingly attached around the edge of aperture 95. A liquid under pressure and cooled, fed through cavity 97 in agitator shaft 92, flows through each annular duct 101 in hollow bars 99, entering central pipe 96 at the top and flowing from cavity 100 into central drain duct 98, whence it is led away. It should be noted that the central and annular ducts do not constitute a parallel system, but a series system from the point of view of the flow of liquid. Thus, for example, the feed flow of cooled pressure medium, running in FIG. 20 from the right in annular duct 97, is constantly fed from a feed line lying to the right, whereas central tube 93 is closed at its right-hand end. In contrast to this, annular duct 97 terminates at the left-hand end of the shaft, whereas central tube 93 is connected at the left to a pipeline system which carries away the used liquid. In this way, according to the system shown in FIG. 20, a constant forced circulation of fresh cooling or heating medium through outer annular ducts 101 of agitator bars 99 is ensured.

The foregoing is a description of a preferred embodiment of the invention by way of example only and the invention is not limited to the specific features shown but contemplates all such variations as come within the spirit of the invention as defined by the following claims.

What is claimed is:

1. Apparatus for coating particles such as chips, fibres and the like with bonding agent, which apparatus comprises:
a drum;
means for introducing bonding agent into said drum;
agitating means for mixing particles contained in said drum;
at least one aperture for discharging particles from said drum;
a sorting chamber positioned above said drum and having a length less than the length of said drum;
charging means to supply particles to the upper portion of said sorting chamber;
an air reflector positioned at one end of said sorting chamber; and
an air nozzle passing through said chamber and having a mouth adjacent said air reflector;
whereby air from said air pipe is reflected by said reflector, thereby affecting the paths of particles passing downwardly through said sorting chamber to said drum.

2. Apparatus according to claim 1, in which the air nozzle has a longitudinal slit-like flow cross-section at its mouth.

3. Apparatus according to claim 2, in which the mouth of said nozzle does not lie in the path of particles falling through said sorting chamber.

4. Apparatus according to claim 3 in which the flow cross-section of said nozzle is constant in area along its length.

5. Apparatus according to claim 4, in which the entire upper edge of the air nozzle is made in the form of a sharp gable.

6. Apparatus according to claim 4, in which below the charging means the air nozzle is open at the top, whereby some of the particles fed into said sorting chamber fall into said air nozzle and are thrown against said reflector.

7. Apparatus according to claim 1, in which the reflector is provided with vertically arranged guide vanes on both sides of the air nozzle, for the purpose of stabilizing the deflected flow of air.

8. Apparatus according to claim 1, in which the air nozzle is divided in its central, vertical, longitudinal plane, and is capable of being opened by means of hinges attached to the upper edge.

9. Apparatus according to claim 1, in which the air reflector is attached to an outwardly pivotable door.

10. Apparatus according to claim 1, additionally comprising a plurality of substantially parallel, synchronously driven agitator shafts fitted with agitator arms positioned to agitate particles in said drum.

11. Apparatus as claimed in claim 10, in which adjacent agitator shafts are rotated in opposite directions, the agitator arms on said adjacent shafts are staggered in relation to each other in pairs by a small amount and one shaft always leads an adjacent shaft by an adjustable angle, so that pairs of engaging agitator arms of said adjacent shafts act to move said particles along said drum.

12. Apparatus according to claim 10, having an endless chain drive for the agitator shafts, which passes over a pinion on each said shaft to drive that shaft whereby the lead angle between adjacent shafts can be adjusted by rotating the pinion of the relevant shaft in relation to the chain.

13. Apparatus according to claim 10, in which the agitator shafts are hollow and are provided with hollow agitator arms through which a flow of heating exchange medium passes.

14. Apparatus according to claim 13, in which each hollow agitator shaft is divided into a central duct and an annular duct, said central duct being fitted with hollow bars which communicate with the interior of said central duct, which are open at their other ends and which are arranged co-axially within the hollow agitator arms in such a manner that a medium under pressure, adapted to exchange heat, enters through the annular duct of the agitator shaft, reaches the central duct through the agitator arms and their coaxial hollow bars.

15. Apparatus according to claim 10 in which the agitator shafts have hollow cavities therethrough, are rotatably and sealingly mounted in relation to a stationary connector at each shaft end, and are traversed by a liquid for the purpose of heat exchange; the agitator arms have cavities which communicate at their bases with the respective shaft cavities, and a liquid feed is passed into said shafts.

16. Apparatus according to claim 10 in which a plurality of apertures are provided for discharging particles from said drum and said apertures run approximately from the height of the axes of the agitator shafts downwardly towards the bottom of said drum, the free passage cross sections of said apertures being controllable by means of adjustable slides which when moved downward, open said apertures from the top.

17. Apparatus according to claim 16, in which at each discharge aperture there is arranged, in addition to the adjustable slide, an adjustable flap serving to close off said discharge aperture.

18. Device according to claim 10, in which the ratio of the length of the agitator arms to the diameter of the agitator shafts is less than 5:1.

19. Apparatus according to claim 1, in which a partition in the form of a vertically adjustable slide is inserted in the upper portion of said drum between said means for introducing bonding agent and said aperture.

20. Apparatus according to claim 1, in which said means for introducing bonding agent is spraying means positioned above said particles, and the ratio of the width of the surface of the particles exposed to said spraying means to the depth thereof is at least 3:1 at the normal degree of filling of said drum.

References Cited

UNITED STATES PATENTS

| | | | |
|---|---|---|---|
| 657,998 | 9/1900 | Williams | 209—143 X |
| 1,401,795 | 12/1921 | Kohler et al. | 209—143 X |
| 1,669,962 | 5/1928 | Wihlfahrt | 259—26 |

FOREIGN PATENTS

| | | |
|---|---|---|
| 939,759 | 4/1948 | France. |
| 107,971 | 7/1943 | Sweden. |

WALTER A. SCHEEL, *Primary Examiner.*

J. M. BELL, *Assistant Examiner.*